United States Patent [19]

Blanco

[11] 4,426,506

[45] Jan. 17, 1984

[54] ALPHA-BETA UNSATURATED UREIDE POLYMERS, METHOD FOR MAKING SAME AND CURED ELASTOMERS PRODUCED THEREFROM

[75] Inventor: Fernando E. Blanco, Arleta, Calif.

[73] Assignee: Products Research & Chemical Corp., Glendale, Calif.

[21] Appl. No.: 418,667

[22] Filed: Sep. 16, 1982

[51] Int. Cl.³ .............................................. C08G 71/02
[52] U.S. Cl. .................... 526/302; 526/128; 526/218
[58] Field of Search ................. 526/302; 525/218, 128

[56] References Cited

U.S. PATENT DOCUMENTS

| | | | |
|---|---|---|---|
| 2,847,400 | 8/1958 | Bortnick | 526/362 |
| 3,441,365 | 4/1969 | Lowell | 525/128 |
| 3,640,676 | 2/1976 | McKillip et al. | 526/302 |
| 4,235,979 | 11/1980 | Hergenroth et al. | 525/128 |

Primary Examiner—Joseph L. Schofer
Assistant Examiner—Peter F. Kulkosky
Attorney, Agent, or Firm—Poms, Smith, Lande & Rose

[57] ABSTRACT

A liquid, highly reactive alpha-beta ureide having the formula:

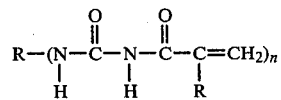

wherein R is a polymeric backbone having no groups reactive with alpha-beta unsaturated amides, n is from 2 to 4 and $R_1$ is hydrogen, lower alkyl or halogen, the cured elastomer resulting therefrom, and a method for making same.

14 Claims, No Drawings

ALPHA-BETA UNSATURATED UREIDE POLYMERS, METHOD FOR MAKING SAME AND CURED ELASTOMERS PRODUCED THEREFROM

BACKGROUND OF THE INVENTION

Polyacrylates are among the earliest of synthetic polymers. They are available in plastic forms, as rubbery elastomers and as reactive liquids.

All of the acrylates show poor low temperature flexibility and hydrolytic instability. The acrylic based reactive liquids yield relatively brittle, low elongation materials which find their principal application in adhesives.

U.S. Pat. No. 3,686,304 discloses a method for making an acrylic ureide monomer by reacting acrylyl or methacrylyl chloride with urea to form acrylic ureide or methacrylic ureide. The acrylic or methacrylic ureide monomers resulting from this reaction are stated to be useful, inter alia, as pesticides or as intermediates for the production of synthetic resins, textile stabilizers, baking finishes and pesticides. However, there is no disclosure in the patent of how the acrylic ureide monomers may be used as intermediates for the production of synthetic resins.

SUMMARY OF THE INVENTION

The present invention is based, in part, upon the surprising discovery that polymers having terminal olefinic unsaturation can be produced from a wide variety of liquid materials with active hydrogen sites to yield liquid polymers that are highly reactive and vulcanizable to produce cured elastomers at ambient temperatures. These terminal olefins may also be converted to liquid polymers with other reactive end groups.

I have found that polymers terminated with alpha-beta unsaturated ureide groups have the foregoing properties, and, in addition, when cured to a solid elastomer or plastic have much higher tensile strengths than the cured precursor liquids without such ureide sites or linkages.

DESCRIPTION OF THE PREFERRED EMBODIMENTS

The highly reactive alpha-beta unsaturated ureide polymers having two to four terminal alpha-beta unsaturated ureide groups of the present invention may be produced easily and effectively by reacting a polymer having two to four reactive isocyanate groups, but no other groups reactive with alpha-beta unsaturated amides, with an alpha-beta unsaturated amide having the following formula:

$$\underset{H}{H-N}-\underset{}{\overset{O}{\overset{\|}{C}}}-\underset{R_1}{C}=CH_2$$

wherein $R_1$ is hydrogen, lower alkyl or halogen.

The reaction between the isocyanate terminated polymer and the alpha-beta unsaturated amide will produce a highly reactive polymer according to the following:

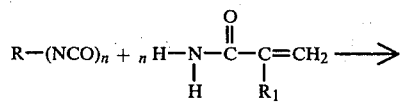

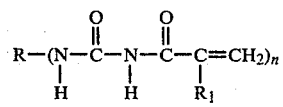

wherein $R_1$ has the same meaning as indicated hereinbefore, n is a number from 2 to 4 and R is the polymeric backbone of the isocyanate containing polymer. In general, the liquid ureide polymer will have a molecular weight of at least about 1,000, e.g., between about 1,000 and 20,000. Thus, the isocyanate containing polymer will have a molecular weight of at least about 500, e.g. 500 to about 20,000.

If the molecular weight of the ureide polymer is too low the polymer is an insoluble gel and not a liquid because of the strong hydrogen bonding present. Therefore it is important to have the molecular weight of the ureide polymer such that a liquid polymer results.

Surprisingly, the conditions under which the foregoing reaction takes place are simple and straightforward, requiring no catalysts or special conditions. Merely mixing the isocyanate containing polymer with the unsaturated amide and heating for a sufficient length of time to substantially complete the reaction as indicated by disappearance of the isocyanate groups, is sufficient.

The reaction mixture is heated to a sufficient temperature to cause the isocyanate containing polymer and alpha-beta unsaturated amide to react. Typically this temperature is at least about 200° F. The reaction mixture is maintained at this temperature until the reaction is complete as indicated by the consumption of substantially all the isocyanate. The preferred reaction temperature is between about 200° F. and about 250° F. It is also desirable to exclude ambient moisture which may be done in a variety of ways, as is known by those skilled in the art. For example, the reaction may be conducted under a blanket of dry nitrogen, or under reduced pressure, etc.

The extreme reactivity of the acrylic ureide polymers of the present invention is illustrated by their fast reaction with aliphatic amines at room temperature to produce tough, rubbery products in a few minutes. Normal acrylic terminated materials do not show such reactivity.

Another extremely useful reaction of the polymers of the present invention is their fast reaction with mercaptans in the presence of tertiary amines as catalysts at room temperature to form rubbery products in a matter of minutes.

Transparent compositions having incorporated ultraviolet light accelerators, the nature of which are well known to those skilled in the art, produce rubbery masses in a few seconds when exposed to sunlight or ultraviolet light.

Still another reaction involves curing the acrylic ureide polymers with a polysiloxane hydride using catalysts known in the art to promote hydride addition to unsaturated bonds. In this case a rubbery mass is also obtained.

The highly active acrylic ureide polymers can be converted to silane terminated products useful in preparing single component sealants which will cure in the manner of the more expensive polysiloxane RTV polymers. Conversions have been accomplished using gamma amino propyl trimethoxy silane, gamma mercapto trimethoxy silane and triethoxy silane hydride.

Such silane reactive polymers can combine good strength, compatibility with plasticizers, and modest cost with the rapid curing characteristics of single component RTV polysiloxane polymers.

The alpha-beta unsaturated amides of the present invention may be either unsubstituted (i.e., acrylamide) or substituted with lower alkyl (preferably methyl) or halogen (preferably chlorine or bromine and more preferably, chlorine). The following amides are among the most useful: acrylamide, methacrylamide, ethyl acrylamide, butyl acrylamide, chloroacrylamide.

Polymers having 2 to 4 reactive isocyanate groups may be produced from nearly any type of polymer precursor containing 1 to 4 active hydrogen sites providing that such precursor, after reaction with isocyanate, has no remaining sites which will react with the alpha-beta unsaturated amides.

Some of the precursor liquid polymers meeting these conditions are as follows: Polypropylene glycol; polybutylene glycol; mercaptan terminated polypropylene glycol; amine terminated polypropylene glycol; polypropylene glycol-urethane mercaptan terminated (U.S. Pat. No. 3,923,748); hydroxyl terminated polythioethers (e.g., U.S. Pat. No. 3,951,927); mercaptan terminated polythioethers; hydroxyl terminated polyesters; mercaptan terminated polysulfides; and hydroxyl terminated polysulfide.

The conversion of the aforementioned precursor liquid polymers to liquid polymers having 2 to 4 isocyanate groups is well known. If the precursor contains only two active hydrogens and a functionality above two is desired, isocyanates with more than two groups per molecule may be employed according to the reaction:

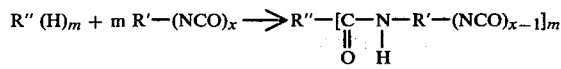

wherein R'' is the precursor liquid polymer backbone, including the atoms to which the active hydrogens are attached, R' is the organic isocyanate backbone, m is all values between 1 and 4, x is all values between 2 and 5, m and x being selected so that the product, m(x−1) is between 2 and 4.

The organic isocyanate compound may contain two to five isocyanate groups including aromatic, cycloaliphatic and aliphatic isocyanates.

Exemplary of organic isocyanates compounds useful in the present invention are: toluene diisocyanate, p,p' methylene diphenyl diisocyanate, 1, 6 hexane diisocyanate, isophorone diisocyanate, triphenyl methane triisocyanate, and polymeric isocyanates.

The invention will be more readily understood from consideration of the following examples which are given for the purpose of illustration only and are not to be considered as limiting the scope of the invention in any way.

EXAMPLE 1

Preparation of a silane terminated ureide polymer 120 grams of polypropylene glycol, a diol having a molecular weight of 2,000, was mixed with 24 grams of alkyl benzyl phthalate (Santicizer 261). After the water content was reduced to less than 0.05% by vacuum degassing, the glycol was reacted with 15.66 grams of toluene diisocyanate, in the presence of 0.06 grams of dibutyl tin dilaurate at 130° F. until infrared analysis showed no hydroxyl band. 4.85 grams of acrylamide was then added and reacted for 16 hours at 225° F., under a blanket of dry nitrogen to exclude moisture from the ambient, until substantially all the NCO was consumed. To the above acrylo ureide polymer, 14.64 grams of gamma amino trimethoxy silane was added under vacuum (28 inches of mercury) and reacted for 45 minutes at room temperature. A liquid polymer was obtained that had a skin time of 1 hour at 50% relative humidity and 75° F., and cured to a rubber with a hardness of 24 Rex.

EXAMPLE 2

Preparation of a trifunctional ureide polymer

An acrylo ureide polymer was prepared in the following matter: 80 grams of 1500 molecular weight polypropylene triol, 600 grams of a 6300 molecular weight polypropylene triol, and 120 grams of alkyl benzyl phthalate (Santicizer 261) were reacted with 76.7 grams of toluene diisocyanate in the presence of 0.34 grams of dibutyl tin dilaurate catalyst at 130° F. When no hydroxyl was indicated by infrared analysis, 33 grams of acrylamide were added and reacted, at 220° F. for 16 hours and a blanket of nitrogen to exclude ambient moisture. A polymer of 3240 poise viscosity at 77° F. was obtained. This polymer did not react with water, showing the absence of isocyanate.

EXAMPLE 3

Preparation of a difunctional ureide polymer

A polymer was prepared by the same method of Example 2 using 150 grams of polypropylene diol of 4000 molecular weight, 28 grams of alkyl benzyl phthalate (Santicizer 261), 8.7 grams of toluene diisocyanate and 2.3 grams of acrylamide. Again a polymer was obtained that did not react with water. This polymer had a viscosity of 2360 poise at 77° F.

EXAMPLE 4

Vulcanization of a ureide with amines

A two-part system was prepared as follows:

|  | Parts by weight |
|---|---|
| Part A | |
| Polymer from Example 2 | 100 |
| TiO₂ | 12 |
| Silica | 100 |
| Alkyl benzyl phthalate (Santicizer 261) | 100 |
| Xylene | 12 |
| Part B | |
| Meta xylylene diamine | 3.5 |
| Alkyl benzyl phthalate (Santicizer 261) | 31.6 |
| Silica | 47.3 |

When Part A and Part B are mixed, a rubber that had the following properties was obtained:

| | |
|---|---|
| Tensile 124 PSI | Elongation 450% |
| Tear 33 PLI | Hardness 22 Rex |

EXAMPLE 5

Conversion of a ureide to a mercaptan terminated Polyol

A mercaptan terminated polymer was made by heating the following ingredients for fourteen hours at 140° F.:

|  | Parts by weight |
| --- | --- |
| Polymer from Example 2 | 50 |
| Polymer from Example 3 | 50 |
| Xylene | 10 |
| 2,2" dimercapto diethyl ether | 5.5 |
| Triethylamine | 0.1 |

The double bond disappeared from an infrared scan and a mercaptan terminated polymer was thus obtained.

EXAMPLE 6

Curable, one component sealant from a mercaptan terminated ureide

|  | Parts by weight |
| --- | --- |
| Mercaptan polymer of Example 5 | 100 |
| Calcium carbonate | 235 |
| Ferric dimethyl dithiocarbamate | 0.9 |

The material when exposed to air had a skin time of 45 minutes and cured to a rubber with a hardness of 30 Rex and an elongation of 400%.

I claim:

1. A method for producing a highly reactive liquid alpha-beta unsaturated ureide polymer having two to four terminal ureide groups which comprises:
    forming a reaction mixture consisting essentially of
    (a) a liquid polymer reactant having two to four reactive isocyanate groups but no other groups reactive with alpha-beta unsaturated amides and having the formula $R-(NCO)_n$ wherein n is from 2 to 4 and R is the polymeric backbone of the polymeric reactant and (b) an alpha-beta unsaturated amide reactant having the formula:

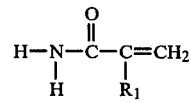

wherein $R_1$ is hydrogen, lower alkyl or halogen and heating said reaction mixture to a temperature sufficient to cause reaction between said polymer reactant and said alpha-beta unsaturated amide reactant and maintaining said temperature until the reaction is substantially complete.

2. A method according to claim 1 wherein said reaction mixture is heated to a temperature of at least about 200° F.

3. A method according to claim 2 wherein said liquid polymer reactant has a molecular weight of between about 500 and about 20,000.

4. A method according to claim 3 wherein $R_1$ is hydrogen or lower alkyl.

5. A method according to claim 3 wherein $R_1$ is halogen.

6. A method according to claim 5 wherein $R_1$ is chlorine or bromine.

7. A method according to claim 4 wherein lower alkyl is methyl.

8. A liquid highly reactive alpha-beta unsaturated ureide polymer having the formula:

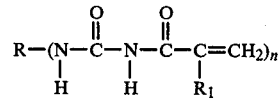

wherein R is a polymeric backbone having no groups reactive with alpha-beta unsaturated amides, n is from 2 to 4 and $R_1$ is hydrogen, lower alkyl or halogen.

9. A polymer according to claim 8 wherein the polymer has a molecular weight greater than about 1,000.

10. A polymer according to claim 9 wherein $R_1$ is hydrogen or lower alkyl.

11. A polymer according to claim 9 wherein $R_1$ is hydrogen.

12. A polymer according to claim 10 wherein lower alkyl is methyl.

13. A polymer according to claim 9 wherein $R_1$ is chlorine or bromine.

14. The solid cured elastomer of the liquid polymer of claim 8.

* * * * *